United States Patent
Brown (10) Patent No.: US 10,119,431 B2
(45) Date of Patent: Nov. 6, 2018

(54) CAMSHAFT PHASER SYSTEMS AND METHOD OF COMMUTATING AN ELECTRIC MOTOR FOR THE SAME

(71) Applicant: BorgWarner Inc., Auburn Hills, MI (US)

(72) Inventor: Daniel Brown, Freeville, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 97 days.

(21) Appl. No.: 15/318,411

(22) PCT Filed: Jun. 18, 2015

(86) PCT No.: PCT/US2015/036362
§ 371 (c)(1),
(2) Date: Dec. 13, 2016

(87) PCT Pub. No.: WO2015/200085
PCT Pub. Date: Dec. 30, 2015

(65) Prior Publication Data
US 2017/0122137 A1 May 4, 2017

Related U.S. Application Data

(60) Provisional application No. 62/016,730, filed on Jun. 25, 2014.

(51) Int. Cl.
*F01L 1/344* (2006.01)
*F01L 1/02* (2006.01)
(Continued)

(52) U.S. Cl.
CPC ............. *F01L 1/344* (2013.01); *F01L 1/02* (2013.01); *F01L 1/024* (2013.01); *F01L 1/047* (2013.01);
(Continued)

(58) Field of Classification Search
CPC ... F01L 1/344; F01L 9/04; F01L 1/047; F01L 2009/0403; F01L 2009/0401; H02P 25/03; H02P 6/18
See application file for complete search history.

(56) References Cited

U.S. PATENT DOCUMENTS

5,327,859 A 7/1994 Pierik et al.
5,715,780 A 2/1998 Haller
(Continued)

*Primary Examiner* — Mark Laurenzi
*Assistant Examiner* — Wesley Harris (57) ABSTRACT

A system (42) including a phaser (28), a motor (38), and a controller (40) for controlling the phase between a camshaft (18) and a crankshaft (16) of an engine (10). The phaser (28) is attached to the camshaft (18), is in communication with the crankshaft (16), and is configured to adjust the phase of the camshaft (18). The motor (38) actuates the phaser (28) and is operatively attached to and in communication with the phaser (28) such that rotation of the crankshaft (16) back-drives the motor (38) to subsequently generate a signal. The controller (40) is in electrical communication with the motor (38), is responsive to the signal, and uses the signal to determine the rotational speed of the motor (38) to thereby commutate the motor (38) and subsequently drive the motor (38) so as to actuate the phaser (28) and control the phase of the camshaft (18).

14 Claims, 5 Drawing Sheets

(51) Int. Cl.
    *F01L 1/352*     (2006.01)
    *H02P 25/03*     (2016.01)
    *F01L 1/047*     (2006.01)
    *F01L 9/04*     (2006.01)
    *H02P 6/18*     (2016.01)
    *F01L 1/053*     (2006.01)

(52) U.S. Cl.
    CPC ............... *F01L 1/352* (2013.01); *F01L 9/04* (2013.01); *H02P 6/18* (2013.01); *H02P 25/03* (2016.02); *F01L 2001/0537* (2013.01); *F01L 2001/3522* (2013.01); *F01L 2009/0401* (2013.01); *F01L 2009/0403* (2013.01)

(56) References Cited

U.S. PATENT DOCUMENTS

| | | |
|---|---|---|
| 7,063,057 B1 | 6/2006 | Waters et al. |
| 7,107,951 B2 | 9/2006 | Urushihata et al. |
| 7,363,896 B2 | 4/2008 | Urushihata et al. |
| 7,624,710 B2 | 12/2009 | Uehama et al. |
| 7,814,878 B2 | 10/2010 | Petridis et al. |
| 2004/0188193 A1* | 9/2004 | Fulks ................ B60T 13/02 188/156 |
| 2011/0030632 A1* | 2/2011 | David ................ F01L 1/344 123/90.17 |

\* cited by examiner

CAMSHAFT PHASER SYSTEMS AND METHOD OF COMMUTATING AN ELECTRIC MOTOR FOR THE SAME

CROSS REFERENCE TO RELATED APPLICATIONS

This application is a National Stage of International Patent Application No. PCT/US2015/036362 filed on Jun. 18, 2015, which claims priority to and all the benefits of U.S. Provisional Patent Application No. 62/016,730 filed on Jun. 25, 2014, both of which are hereby expressly incorporated herein by reference in their entirety.

BACKGROUND OF INVENTION

1. Field of Invention

The present invention relates, generally, to camshaft phaser systems and, more specifically, to a method of commutating electric motors for camshaft phaser systems.

2. Description of the Related Art

Conventional automotive variable valve timing systems known in the art typically include an internal combustion engine that has a crankshaft and one or more camshafts controlled by one or more camshaft phasers. Phasers are used to alter the timing of valve events so as to improve engine performance, fuel economy, and emissions. Phasers are typically operatively attached to an end of the camshaft and are also in rotational communication with the engine crankshaft, so as to either advance or retard the phase of the camshaft with respect to the crankshaft. Phasers can be actuated in a number of different ways, and have historically been controlled using servo-controlled hydraulic pressure. However, the recent trend in the art is to control phasers with electric motors, which can provide broader phase control and improved response time. The electric motor and phaser are operatively attached to each other and in rotational communication so as to allow rotation of the electric motor to adjust the phase angle of the camshaft. The electric motor is typically controlled by an engine control unit (ECU), which controls fuel delivery and ignition timing.

Electric motors used with camshaft phasers known in the art are typically brushless DC electric motors, which provide longer life, better control, and faster response than conventional brushed DC electric motors. However, unlike conventional brushed DC electric motors, brushless DC electric motors are not commutated by mechanical switching and, thus, require additional circuitry to effect commutation. To that end, brushless DC electric motors typically include a plurality of internal hall-effect sensors and circuitry used to commutate the electric motor and subsequently actuate and control the phaser so as to control the phase of the camshaft.

Each of the components of a variable valve timing system of the type described above must cooperate to effectively control the camshaft phaser. In addition, each of the components must be designed not only to facilitate improved performance and efficiency, but also so as to reduce the cost and complexity of manufacturing and assembling the phaser system. While camshaft phaser systems known in the related art have generally performed well for their intended purpose, there remains a need in the art for a camshaft phaser system that has superior operational characteristics, and, at the same time, reduces the cost and complexity of manufacturing the components of the system, as well as the overall dimensions of the various components.

SUMMARY OF THE INVENTION

The present invention overcomes the disadvantages in the related art in a camshaft phaser system for use in controlling the phase between a camshaft and a crankshaft of an internal combustion engine. The system includes a phaser, an electric motor, and a controller. The phaser is operatively attached to the camshaft and in rotational communication with the crankshaft, and is configured to adjust the phase of the camshaft with respect to the crankshaft. The electric motor actuates the phaser and is operatively attached to and in rotational communication with the phaser, such that rotation of the crankshaft back-drives the electric motor and the electric motor subsequently generates a signal. The controller is in electrical communication with the electric motor and is responsive to the signal. The controller uses the signal to determine the rotational position and speed of the electric motor to thereby commutate the electric motor and subsequently drive the electric motor so as to actuate the phaser and control the phase of the camshaft.

In addition, the present invention is directed toward a method of commutating a synchronous electric motor for use in actuating a phaser used to control the phase between a camshaft and a crankshaft of an internal combustion engine. The method includes the steps of: providing a phaser operatively attached to the camshaft and in rotational communication with the crankshaft; providing an electric motor operatively attached to and in rotational communication with the phaser; providing a controller in electrical communication with the electric motor; rotating the crankshaft at a predetermined speed such that the phaser back-drives the electric motor; generating a signal with the electric motor in response to being back-driven; detecting the signal using the controller; determining a back-drive speed of the electric motor based on the signal using the controller; commutating the electric motor based on the signal using the controller; and, driving the electric motor using the controller so as to actuate the phaser and control the phase of the camshaft.

Further, the present invention is directed toward a camshaft phaser system for use in controlling the phase between a camshaft and a crankshaft of an internal combustion engine. The system includes a phaser, an electric motor, and a controller. The phaser is operatively attached to the camshaft and in rotational communication with the crankshaft, and is configured to adjust the phase of the camshaft with respect to the crankshaft. The electric motor actuates the phaser and is operatively attached to and in rotational communication with the phaser. The electric motor has a plurality of coils in spaced radial arrangement with a rotor. The controller is in electrical communication with the electric motor, and has a determination section and a control section. The determination section is programmed to send a carrier signal over the coils of the electric motor to determine a static position of the rotor. The control section is programmed to use the static position from the determination section to commutate the electric motor and subsequently drive the electric motor so as to actuate the phaser and control the phase of the camshaft.

In this way, the present invention significantly reduces the complexity, cost, and packaging size of the electric motor and its associated components. Moreover, the present invention reduces the cost of manufacturing camshaft phaser systems that have superior operational characteristics, such as improved performance, control, and efficiency.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
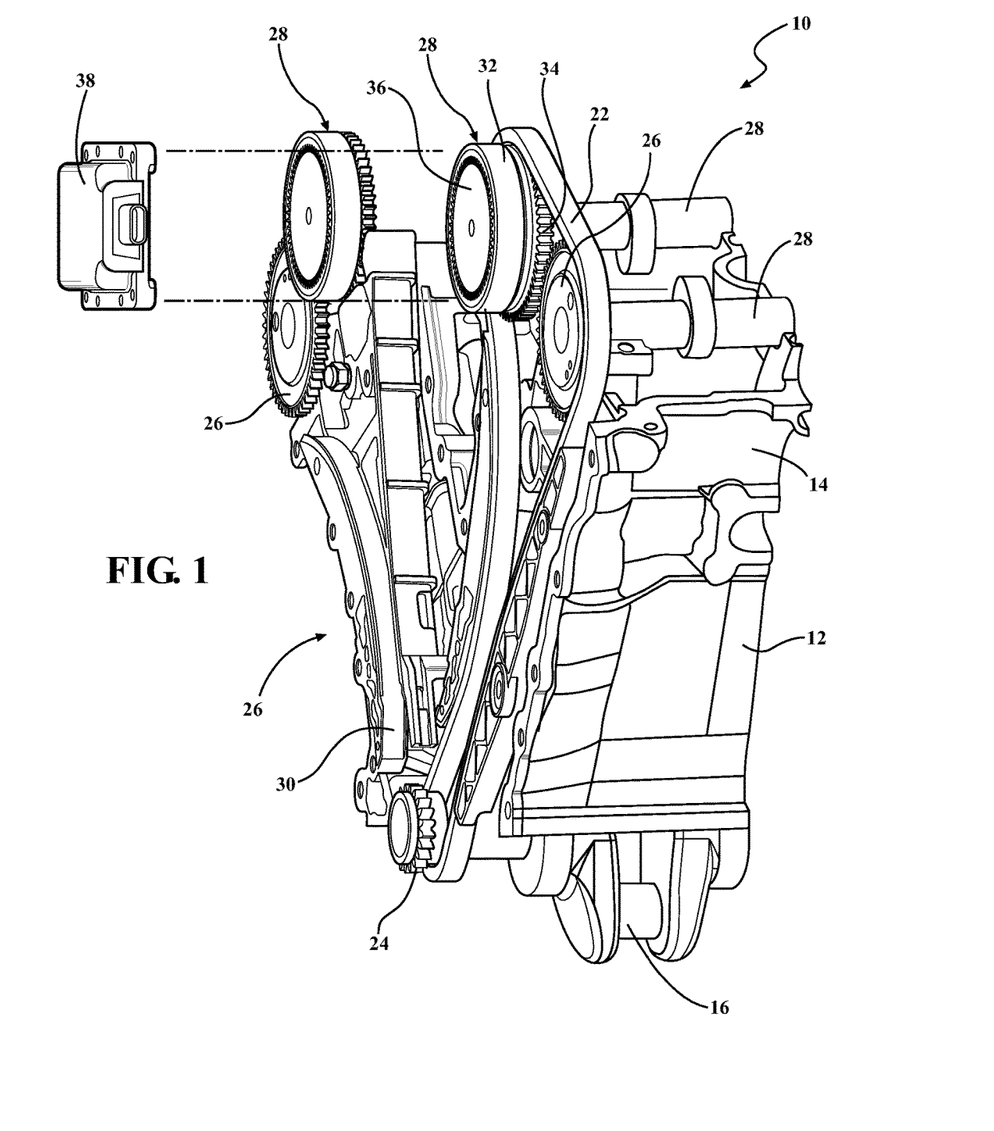
FIG. 1 is a partial exploded perspective view of an automotive engine showing a camshaft phaser, an electric motor, and a controller, according to one embodiment of the present invention.

Referring now to the figures, where like numerals are used to designate like structure, a portion of an internal combustion engine of an automobile is illustrated at 10 in FIG. 1. The engine 10 includes a block 12 and one or more cylinder heads 14 mounted to the block 12. A crankshaft 16 is rotatably supported in the block 12, and one or more camshafts 18 are rotatably supported in the cylinder head 14. The crankshaft 16 drives the camshafts 18 via a timing system, generally indicated at 20. The timing system 20 typically includes a chain, generically shown at 22 in FIG. 1, which interconnects a crankshaft sprocket 24 to one or more camshaft sprockets 26 and phasers 28. The timing system 20 may also include a tension guide 30 to ensure proper tension of the chain 22 in operation. While the representative embodiment illustrated in FIG. 1 depicts a chain 22 and sprockets 24, 26, those having ordinary skill in the art will appreciate that the timing system 20 could utilize any suitable configuration sufficient to drive the camshafts 18 with the crankshaft 16 without departing from the scope of the present example. By way of non-limiting example, a timing belt in conjunction with timing gears could be utilized.

The engine 10 generates rotational torque which is subsequently translated by the crankshaft 16 to the camshafts 18 which, in turn, actuate valves (not shown, but generally known in the art) in the cylinder head 14 for controlling the timing of the flow of intake and exhaust gasses. Specifically, the camshafts 18 control what is commonly referred to in the art as "valve events," whereby the camshaft 18 opens and closes intake and exhaust valves at specific time intervals with respect to the rotational position of the crankshaft 16, so as to effect a complete thermodynamic cycle of the engine 10. It will be appreciated that the crankshaft 16 can rotate at different predetermined speeds which correspond to engine 10 operating state. By way of non-limiting example, the crankshaft 16 can be rotated at different speeds during engine 10 idle, cruising, start-up, acceleration, and the like. While the engine 10 illustrated in FIG. 1 is a V-configured, dual-overhead-cam (DOHC), spark-ignition Otto-cycle engine, with phasers 28 on each intake camshaft 18, those having ordinary skill in the art will appreciate that the engine 10 could be of any suitable configuration, with any suitable number of camshafts 18 disposed in any suitable way, controlled using any suitable thermodynamic cycle, and with any suitable number of phasers 28, without departing from the scope of the present invention. As shown best in FIGS. 1 and 2, the phasers 28 are operatively attached to an end of one or more camshafts 18 and are in rotational communication with the crankshaft 16. The phasers 28 are configured to adjust the phase of the camshaft 18 with respect to the crankshaft 16 so as to alter the timing of the valve events discussed above. To that end, the phasers 28 typically include an outer portion 32 with teeth 34 in communication with the timing chain 22, and an inner portion 36 in rotational communication with the camshaft 18 and an actuator, such as an electric motor 38 driven by a controller 40. Thus, the phaser 28, electric motor 38, and controller 40 define a system 42 for controlling the phase between the camshaft 18 and crankshaft 16 of the engine 10, as discussed above. Each of these components will be described in greater detail below.

The system 42 of the present invention includes an electric motor 38, as discussed above. The electric motor 38 actuates the phaser 28 and is operatively attached to and in rotational communication with the phaser 28 such that rotation of the crankshaft 16 back-drives the electric motor 38, which generates a signal in response to being back-driven. As shown best in FIG. 8, the electric motor 38 of the present invention is a sensorless, brushless, DC electric motor, and has an internal rotor 44 and an external stator 46 with a plurality of windings or coils 48, which are in spaced radial arrangement with the rotor 44. Moreover, those having ordinary skill in the art will appreciate that the electric motor 38 lacks internal rotation sensors (such as hall-effect sensors) and, thus, is not internally commutated. Further, it will be appreciated that this configuration affords significantly reduced geometry and packaging of the system 42, and fewer wires and less complicated connectors are required in connection with the electric motor 38. As shown best in FIGS. 2 and 8, one embodiment of the electric motor 38 includes a plurality of coils 48, as described above. Each of the plurality of coils 48 of the electric motor 38 may be in electrical communication with the controller 40. As such, the signal generated by the electric motor 38 may be further defined as a plurality of signals, each of which is generated by one of each of the coils 48 of the electric motor 38 when the electric motor 38 is back-driven. In one embodiment, each of the signals may further be defined as an oscillating voltage. While the electric motor 38 schematically illustrated in FIG. 8 includes a total of six coils 48, those having ordinary skill in the art will appreciate that the electric motor 38 could be configured in any suitable way, including a pancake or an axial-flux motor, with any suitable number of coils 48, and with any geometry sufficient to generate a signal when back-driven such that the controller 40 can subsequently commutate the electric motor 38, as described in greater detail below, without departing from the scope of the present invention.

Figure 2:
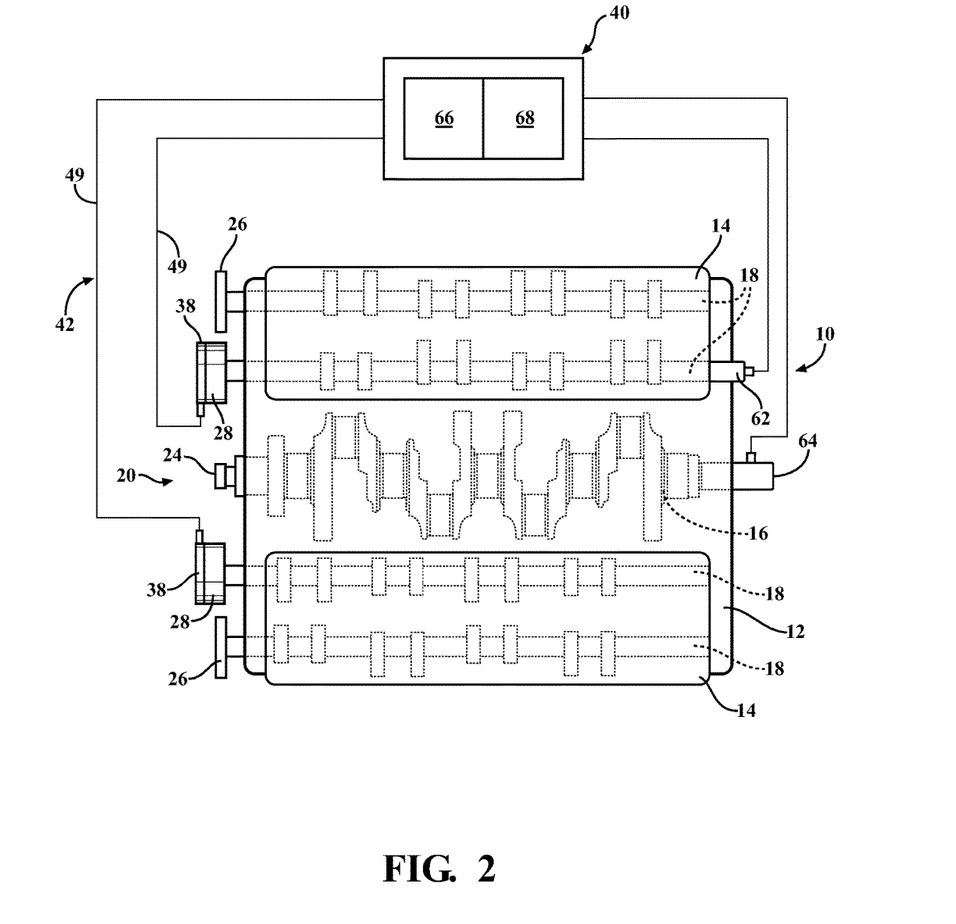
FIG. 2 is a top schematic view of the engine of FIG. 1.

As discussed above, the system 42 of the present invention also includes a controller 40 in electrical communication with the electric motor 38. Referring now to FIGS. 1 and 2, the controller 40 is responsive to the signal from the electric motor 38 and uses the signal to determine the rotational speed of the electric motor 38 to thereby commutate the electric motor 38 and subsequently drive the electric motor 38 so as to actuate the phaser 28 and control the phase of the camshaft 18. In the embodiment illustrated throughout the figures, the electric motor 38 is connected to the controller 40 via a wiring harness 49. However, those having ordinary skill in the art will appreciate that the electric motor 38 and the controller 40 could be in electrical communication in any suitable way without departing from the scope of the present invention. Moreover, while the controller 38 of the present invention is shown as being an electronic control unit (ECU), which also controls the engine 10 ignition timing and fuel delivery, those having ordinary skill in the art will appreciate that the controller 38 could be separated from, or otherwise external with respect to the ECU without departing from the scope of the present invention.

As discussed above, the system 42 of the present invention utilizes a sensorless electric motor 38 to drive the phaser 28. Thus, it will be appreciated that the electric motor 38 must be commutated before it can be driven by the controller 40. This is particularly important at start-up. Moreover, those having ordinary skill in the art will appreciate from the description that follows that the sensorless brushless DC electric motor 38 in the system 42 of the present invention can be commutated by the controller 40 either by cooperating with different features of the phaser 28, or by the controller 40 itself.

Figure 3:
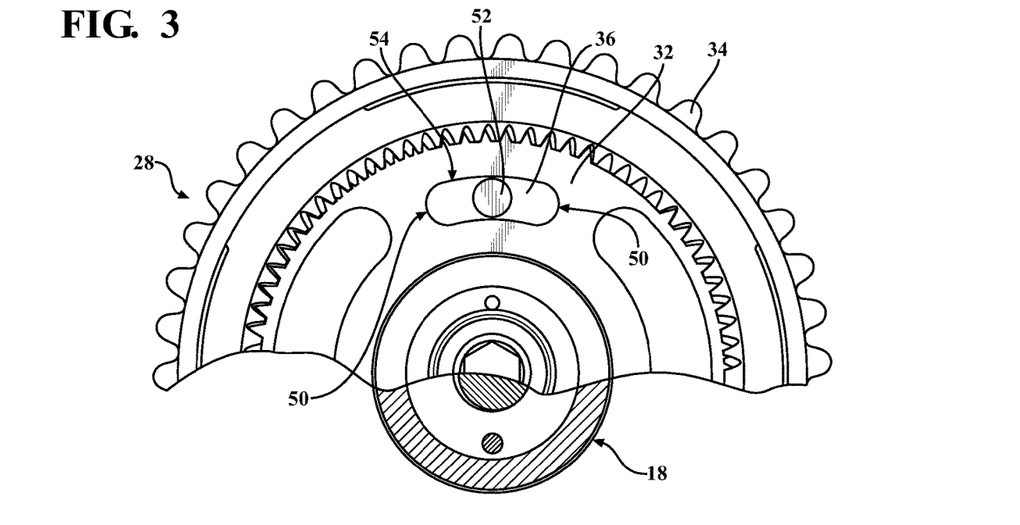
FIG. 3 is an enlarged partial front plan view of a camshaft and a phaser in a first position.
Figure 4:
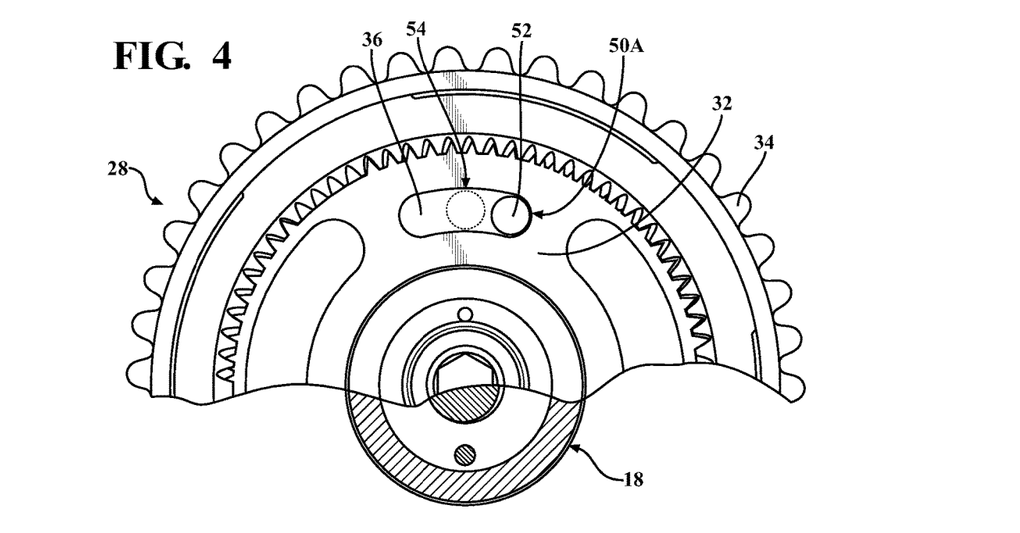
FIG. 4 is an enlarged partial front plan view of a camshaft and a phaser in a second position.
Figure 5:
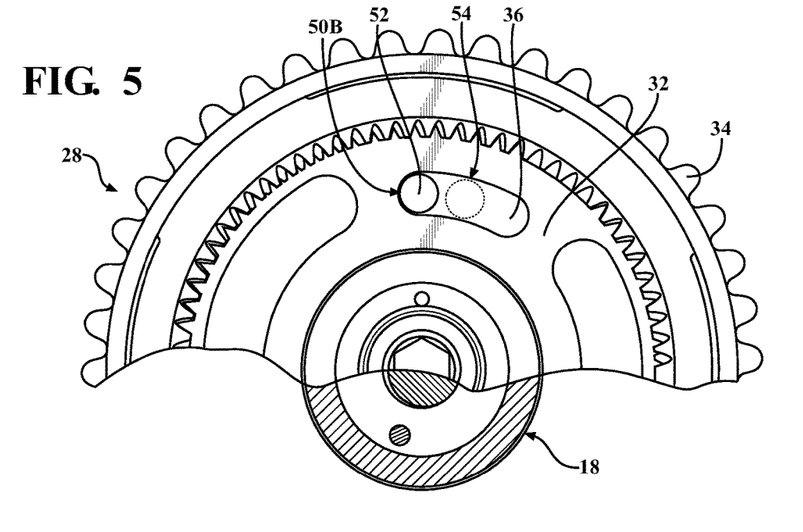
FIG. 5 is an enlarged partial front plan view of a camshaft and a phaser in a third position.

Referring now to FIGS. 3-5, in one embodiment, the phaser 28 may include at least one end stop 50 defining a phase limit between the camshaft 18 and the crankshaft 16, with the phaser being movable to the end stop 50 in response to a predetermined rotational speed differential between the crankshaft 16 and the electric motor 38. To that end, the phaser 28 may include a pin 52 that travels within a slot 54 between two end stops 50A, 50B defining full-retard (see FIG. 4) and full-advance (see FIG. 5), respectively, whereby the pin 52 can move to any suitable position between the end stops 50A, 50B (see FIG. 3) along the slot 54. However, those having ordinary skill in the art will appreciate that the phaser 28 could have any structure, configuration, or feature suitable to move to an end stop 50 in response to a predetermined rotational speed differential between the camshaft 18 and the electric motor 38 without departing from the scope of the present invention.

In one embodiment, the phaser 28 may back-drive the electric motor 38 when the phaser 28 moves to the end stop 50 so to generate the signal, as discussed above. In operation, when the engine is started, rotation of the crankshaft 16 is translated via the timing chain 22 to the teeth 34 of the outer portion 32 of the phaser 28. As the crankshaft 16 rotates, the outer portion 32 of the phaser 28 rotates at a different speed than the inner portion 36 of the phaser 28, which causes the pin 52 to travel within the slot 54 and against the end stop 50. Once the pin 52 reaches full-retard 50A or full-advance 50B, both portions 32, 38 of the phaser 28 rotate together and, thus, rotation is translated both to the camshaft 18 and to the electric motor 38. Once the electric motor 38 rotates, a signal is generated and interpreted by the controller 40 such that the controller 40 determines the rotational position and/or speed of the electric motor 38 and is then able to commutate the electric motor 38. Those having ordinary skill in the art will appreciate that the phaser 28 could have structure other than the pin 52 and slot 54 described above, sufficient to move the phaser 28 to an end stop 50, without departing from the scope of the present invention.

Referring now to FIGS. 1-5, in one embodiment, the controller 40 sends a predetermined sequence of commutation states to the electric motor 38 such that the electric motor 38 moves the phaser 28 to the end stop 50, wherein subsequent rotation of the crankshaft 16 causes the phaser 28 to back-drive the electric motor 38 and generate a signal used by the controller 40 to commutate the electric motor 38 as described above. Those having ordinary skill in the art will appreciate that the sequence of predetermined commutation states is determined based on the configuration of the engine 10 timing system 20, the construction of the phaser 28, and the configuration of the rotor 44 and stator 46 of the electric motor 38. Thus, it will be appreciated that the sequence discussed above can be determined such that the controller 40 can drive the electric motor 38 at a speed sufficient to move the phaser 28 to the end stop 50. Moreover, it will be appreciated that the sequence could be sent to the electric motor 38 prior to any rotation of the crankshaft 16, during engine 10 starting, or at any other suitable time, without departing from the scope of the present invention.

In one embodiment, as shown best in FIGS. 1 and 2, the system 42 of the present invention may also include at least one camshaft position sensor 62 in electrical communication with the controller 40 and adapted to provide a rotational position signal to the controller 40. The controller 40 uses the rotational position signal to determine the sequence of commutation states discussed above. Those having ordinary skill in the art will appreciate that the system 42 could include any suitable number of camshaft position sensors 62, disposed in any suitable location on the engine 10, without departing from the scope of the present invention. Similarly, in one embodiment, the system 42 of the present invention may include at least one crankshaft position sensor 64 in electrical communication with the controller 40 and adapted to provide a rotational position signal to the controller 40, wherein the controller 40 likewise uses the rotational position signal to determine the sequence of commutation states discussed above. It will be appreciated that any combination of camshaft position sensors 62 and crankshaft position sensors 64 could be utilized without departing from the scope of the present invention.

Figure 6:
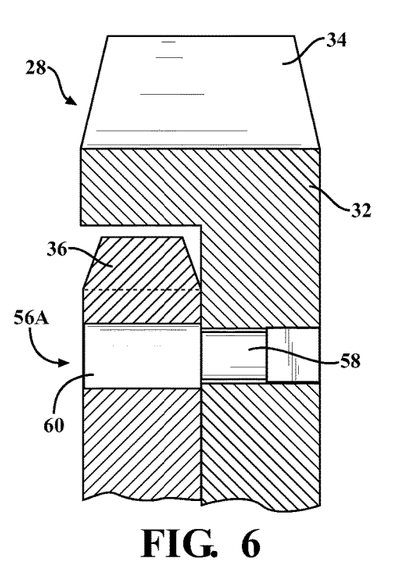
FIG. 6 is an enlarged partial cross-sectional view of a phases in an unlocked configuration.
Figure 7:
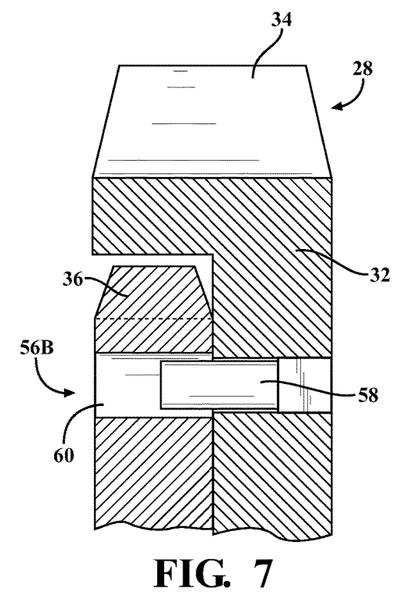
FIG. 7 is an enlarged partial cross-sectional view of the phaser of FIG. 6 in a locked configuration.

Referring now to FIGS. 6 and 7, in one embodiment, the phaser 28 may include a locking mechanism, generally indicated at 56, having an unlocked position 56A (see FIG. 6) wherein the electric motor 38 can control the phase of the camshaft 18, and a locked position 56B (see FIG. 7) wherein the phaser 28 is fixed at a predetermined phase between the camshaft 18 and the crankshaft 16. The locking mechanism 56 is selectively movable between the unlocked position 56A and the locked position 56B. As shown in FIGS. 6 and 7, the locking mechanism 56 may include an actuator 58 that selectively engages a receiver 60 so as to move from the unlocked position 56A to the locked position 56B. While FIGS. 6 and 7 show the actuator 58 disposed on the outer portion 32 of the phaser 28 and the receiver 60 disposed in the inner portion 36 of the phaser 28, those having ordinary skill in the art will appreciate that the locking mechanism 56 could be oriented, configured, or disposed differently so as to fix the phaser 28 at a predetermined phase between the camshaft 18 and the crankshaft 16 such that the electric motor 38 is back-driven by rotation of the crankshaft 16, without departing from the scope of the present invention. Moreover, those having ordinary skill in the art will appreciate that the actuator 58 of the locking mechanism 56 could be actuated in any suitable way without departing from the scope of the present invention.

In one embodiment, the phaser 28 may back-drive the electric motor 38 when the locking mechanism 56 is in the locked position 56B (see FIG. 7). In operation, when the engine is started, rotation of the crankshaft 16 is translated via the timing chain 22 to the teeth 34 of the outer portion 32 of the phaser 28. With the locking mechanism 56 of the phaser 28 in the locked position 56B, as the crankshaft 16 rotates, the outer portion 32 of the phaser 28 rotates at the same speed as the inner portion 36 of the phaser 28 and, thus, rotation from the crankshaft 16 is translated both to the camshaft 18 and to the electric motor 38. Once the electric motor 38 rotates, a signal is generated and interpreted by the controller 40 such that the controller 40 determines the rotational position and/or speed of the electric motor 38 and is then able to commutate the electric motor 38 as described above, wherein the locking mechanism 56 can then be moved to the unlocked position 56A whereby the electric motor 38 can control the phase of the camshaft 18. However, it will be appreciated that the locking mechanism 56 can be moved to the locked position 56B at any suitable time or operation condition of the engine 10. By way of non-limiting example, the locking mechanism 56 could be moved to the locked position 56B prior to rotation of the crankshaft 16, such that the electric motor 38 is back-driven immediately when the engine 10 is started. Moreover, it is conceivable that the locking mechanism 56 could be used in conjunction with the end stop 50 feature discussed above.

Figure 8:
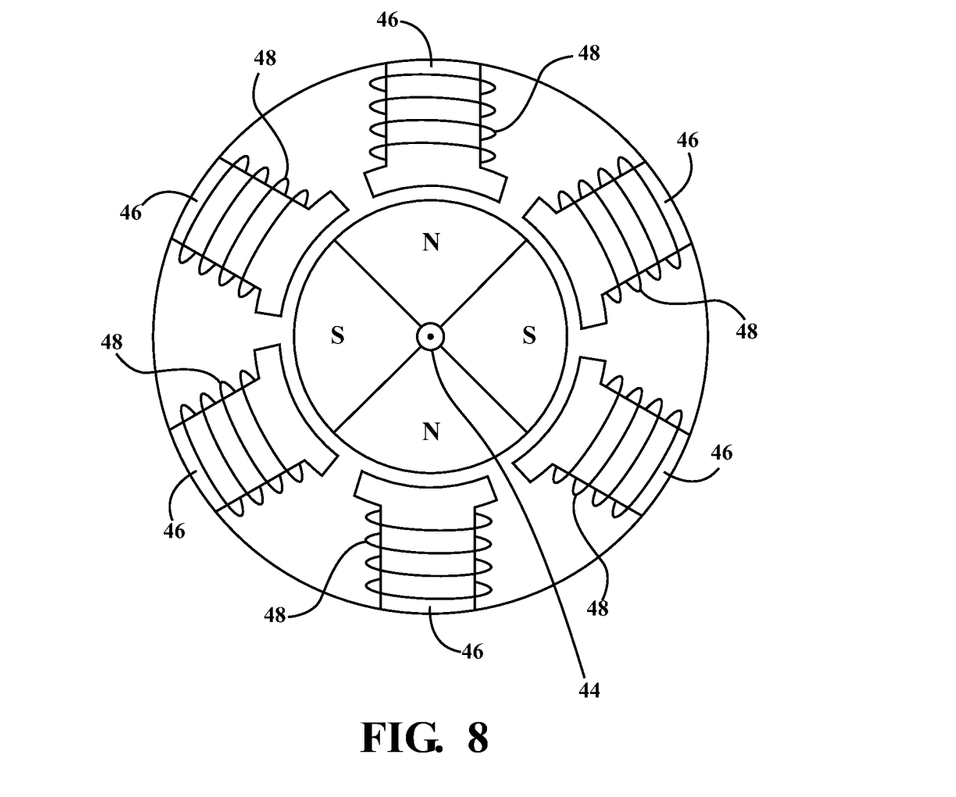
FIG. 8 is an enlarged schematic view of a sensorless brushless DC electric motor according to one embodiment of the present invention.

Referring now to FIGS. 2 and 8, as mentioned above, the sensorless brushless DC electric motor 38 in the system 42 of the present invention can be commutated by the controller 40 itself. To that end, in one embodiment, the controller 40 may include a determination section, generally indicated at 66, and a control section, generally indicated at 68. The determination section 66 of the controller 40 is programmed to send a carrier signal over the coils 48 of the electric motor 38 to determine a static position of the rotor 44. The control section 68 of the controller 40 is programmed to use the static position from the determination section 66 to commutate the electric motor 38 and subsequently drive the electric motor 38 so as to actuate the phaser 28 and control the phase of the camshaft 18. Those having ordinary skill in the art will appreciate that the determination section 66 could be included in the control section 68, or could conceivably be separated from the control section 68. It is to be understood that the determination section 66 and the control section 68 could be in any suitable form within the controller 40 without departing from the scope of the present invention. By way of non-limiting example, the sections 66, 68 could be lines of code, subroutines, programs, etc., either congruent with each other or distinctly separated from each other, without departing from the scope of the present invention.

As is discussed above, the present invention also relates to a method of commutating a synchronous electric motor 38 used to control the phase between a camshaft 18 and a crankshaft 16 of an internal combustion engine 10. Broadly speaking, the method of the present invention includes the steps of: providing a phaser 28 operatively attached to the camshaft 18 and in rotational communication with the crankshaft 16; providing an electric motor 38 operatively attached to and in rotational communication with the phaser 28; providing a controller 40 in electrical communication with the electric motor 38; rotating the crankshaft 16 at a predetermined speed such that the phaser 28 back-drives the electric motor 38; generating a signal with the electric motor 38 in response to being back-driven; detecting the signal using the controller 40; determining a back-drive speed of the electric motor 38 based on the signal using the controller 40; commutating the electric motor 38 based on the back-drive speed using the controller 40; and driving the electric motor 38 using the controller 40 so as to actuate the phaser 28 and control the phase of the camshaft 18.

In addition, the step of detecting the signal using the controller 40 may further include the step of detecting oscillating voltage generated by coils 48 of the electric motor 38 using the controller 44; and the step of determining a back-drive speed of the electric motor 38 based on the signal using the controller 40 may further include the step of determining a back-drive speed of the electric motor 38 based on the oscillating voltages using the controller 40.

Further, the step of rotating the crankshaft 16 at a predetermined speed such that the phaser 28 back-drives the electric motor 38 may further include the step of rotating the crankshaft 16 at a predetermined speed such that the phaser 28 moves to an end stop 50 and subsequently back-drives the electric motor 38. Moreover, the method of the present invention may further include the step of sending a predetermined sequence of commutation states to the electric motor 38 using the controller 40 such that the electric motor 38 moves to an end stop 50 prior to rotation of the crankshaft 16. Further still, the step of rotating the crankshaft 16 at a predetermined speed such that the phaser 28 back-drives the electric motor 38 may be preceded by the additional steps of: providing at least one of a camshaft position sensor 62 and a crankshaft position sensor 64 in electrical communication with the controller 40; determining a rotational position of one of the camshaft 18 and the crankshaft 16 with the sensor 62, 64 using the controller 40; formulating a sequence of commutation states based on the rotational position using the controller 40; and sending the sequence of commutation states to the electric motor 38 using the controller 40 such that the electric motor 38 moves the phaser 28 to the end stop 50.

The method of the present invention may further include the step of locking the phaser 28 such that the phaser 28 is fixed at a predetermined phase between the camshaft 18 and the crankshaft 16 prior to rotation of the crankshaft 16. Similarly, the method of the present invention may further include the step of unlocking the phaser 28 such that the phase of the camshaft 18 can be controlled prior to driving the electric motor 38.

In this way, the method and system 42 of the present invention significantly reduces the complexity, cost, and packaging size of the electric motor 38 and its associated components. Specifically, it will be appreciated that the present invention allows the use of sensorless, brushless, DC electric motors 38 with significantly smaller geometry, weight, and wiring requirements than brushless DC electric motors having internal hall-effect sensors and for commutation. Moreover, the present invention reduces the cost of manufacturing camshaft 18 phaser systems 42 that have superior operational characteristics, such as improved performance, control capability, weight, component life and longevity, and efficiency.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A camshaft (18) phaser (28) system (42) for use in controlling the phase between a camshaft (18) and a crankshaft (16) of an internal combustion engine (10), said system comprising:
   a phaser (28) operatively attached to the camshaft (18) and in rotational communication with the crankshaft (16) for adjusting the phase of the camshaft (18) with respect to the crankshaft (16);
   an electric motor (38) that actuates said phaser (28), said electric motor (38) operatively attached to and in rotational communication with said phaser (28) such that rotation of the crankshaft (16) back-drives said electric motor (38) and said electric motor (38) generates a signal; and
   a controller (40) in electrical communication with said electric motor (38), said controller (40) being responsive to said signal to thereby commutate said electric motor (38) and subsequently drive said electric motor (38) so as to actuate said phaser (28) and control the phase of the camshaft (18).

2. The system (42) as set forth in claim 1; wherein said electric motor (38) includes a plurality of coils (48) with each of said coils (48) being in electrical communication with said controller (40), and wherein said signal is further defined as a plurality of signals each generated by one of each of said coils (48) when said electric motor (38) is back-driven.

3. The system (42) as set forth in claim 2, wherein each of said signals is further defined as an oscillating voltage.

4. The system (42) as set forth in claim 1, wherein said phaser (28) includes at least one end stop (50) defining a phase limit between the camshaft (18) and the crankshaft (16), said phaser (28) being movable to said at least one end stop (50) in response to a predetermined rotational speed differential between the crankshaft (16) and said electric motor (38).

5. The system (42) as set forth in claim 4, wherein said phaser (28) back-drives said electric motor (38) when said phaser (28) moves to said end stop (50).

6. The system (42) as set forth in claim 5, wherein rotation of the crankshaft (16) causes said phaser (28) to move to said end stop (50).

7. The system (42) as set forth in claim 4, wherein said controller (40) sends a predetermined sequence of commutation states to said electric motor (38) such that said electric motor (38) moves said phaser (28) to said at least one end stop (50), and wherein subsequent rotation of the crankshaft (16) causes said phaser (28) to back-drive said electric motor (38).

8. The system (42) as set forth in claim 7, further including at least one camshaft position sensor (62) in electrical communication with said controller (40) and adapted to provide a rotational position signal thereto; and
   wherein said controller (40) uses said rotational position signal to determine said sequence of commutation states.

9. The system (42) as set forth in claim 1, wherein said phaser (28) includes a locking mechanism (56) having an unlocked position (56A) wherein said electric motor (38) can control the phase of the camshaft (18), and a locked position (56B) wherein said phaser (28) is fixed at a predetermined phase between the camshaft (18) and the crankshaft (16), said locking mechanism (56) being selectively movable between said unlocked position (56A) and said locked position (56B).

10. The system (42) as set forth in claim 9, wherein said phaser (28) back-drives said electric motor (38) when said locking mechanism (56) is in said locked position (56B).

11. A method of commutating a synchronous electric motor (38) for use in actuating a phaser (28) used to control the phase between a camshaft (18) and a crankshaft (16) of an internal combustion engine (10), said method comprising the steps of:
   providing a phaser (28) operatively attached to the camshaft (18) and in rotational communication with the crankshaft (16);
   providing an electric motor (38) operatively attached to and in rotational communication with said phaser (28);
   providing a controller (40) in electrical communication with said electric motor (38);
   rotating the crankshaft (16) at a predetermined speed such that said phaser (28) back-drives said electric motor (38);
   generating a signal with said electric motor (38) in response to being back-driven;
   detecting said signal using said controller (40);
   determining a back-drive speed of said electric motor (38) based on said signal using said controller (40);
   commutating said electric motor (38) based on said signal using said controller (40); and
   driving said electric motor (38) using said controller (40) so as to actuate said phaser (28) and control the phase of the camshaft (18).

12. The method as set forth in claim 11, wherein the step of detecting said signal using said controller (40) further includes the step of detecting oscillating voltage generated by coils (48) of said electric motor (38) using said controller (40); and
   the step of determining a back-drive speed of said electric motor (38) based on said signal using said controller (40) further includes the step of determining a back-drive speed of said electric motor (38) based on said oscillating voltages using said controller (40).

13. The method as set forth in claim 11, wherein the step of rotating the crankshaft (16) at a predetermined speed such that said phaser (28) back-drives said electric motor (38) further includes the step of rotating the crankshaft (16) at a predetermined speed such that said phaser (28) moves to an end stop (50) and subsequently back-drives said electric motor (38).

14. The method as set forth in claim 11, further including the step of sending a predetermined sequence of commutation states to said electric motor (38) using said controller (40) such that said electric motor (38) moves said phaser (28) to an end stop (50) prior rotation of the crankshaft (16).

* * * * *